(12) United States Patent
Shinagawa (10) Patent No.: US 11,720,772 B2
(45) Date of Patent: Aug. 8, 2023

(54) IMAGE FORMING APPARATUS FOR PREDICTING USAGE OF CONSUMABLES AND CONTROL METHOD FOR IMAGE FORMING APPARATUS

(71) Applicant: CANON KABUSHIKI KAISHA, Tokyo (JP)

(72) Inventor: Kazutaka Shinagawa, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/816,860

(22) Filed: Aug. 2, 2022

(65) Prior Publication Data

US 2022/0374666 A1   Nov. 24, 2022

Related U.S. Application Data

(63) Continuation of application No. 17/394,250, filed on Aug. 4, 2021, now Pat. No. 11,436,457, which is a continuation of application No. 16/666,204, filed on Oct. 28, 2019, now Pat. No. 11,120,316.

(30) Foreign Application Priority Data

Oct. 31, 2018   (JP) ................. 2018-205869

(51) Int. Cl.
*G06K 15/00* (2006.01)

(52) U.S. Cl.
CPC ....... *G06K 15/4075* (2013.01); *G06K 15/002* (2013.01)

(58) Field of Classification Search
None
See application file for complete search history.

(56) References Cited

U.S. PATENT DOCUMENTS

2008/0111842 A1\* 5/2008 Hall .................... B41J 2/17566
347/7

FOREIGN PATENT DOCUMENTS

JP   2006098896 A   4/2006
JP   2014215468 A   11/2014

\* cited by examiner

*Primary Examiner* — Lennin R RodriguezGonzalez
(74) *Attorney, Agent, or Firm* — Canon U.S.A., Inc. IP Division (57) ABSTRACT

An image forming apparatus on which a replaceable container storing a recording material is mounted includes an image forming unit configured to form an image using the recording material, a determination unit configured to determine whether the container satisfies a predetermined condition, an acquisition unit configured to acquire an amount of the recording material used for image formation in a predetermined period and stored in the container determined as a container that satisfies the predetermined condition, a memory configured to accumulate information indicating the amount of the recording material acquired by the acquisition unit, and a prediction unit configured to predict a number of days about replacement of the container, based on the information indicating the amount of the recording material and accumulated in the memory.

14 Claims, 5 Drawing Sheets

STATUS CHECK/STOP — 301

< CONSUMABLE ITEM INFORMATION > — 320

| ITEM | MODEL NUMBER | STATE | NUMBER OF REMAINING DAYS |
|---|---|---|---|
| BLACK TONER (K) | UNKNOWN | 100% | 1 YEAR OR MORE |
| YELLOW TONER (Y) | UNKNOWN | 100% | 1 YEAR OR MORE |
| MAGENTA TONER (M) | NPG-YYY | 24% | 41 DAYS |
| CYAN TONER (C) | NPG-YYY | 36% | 69 DAYS |
| COLLECTED TONER CONTAINER | WT-XXX | 90% | 1 YEAR OR MORE |

321 / 322 / 323

OK — 330

NON-DESIGNATED CARTRIDGE IS LIKELY TO HAVE BEEN SET FOR TONER (BLACK/YELLOW) — 310

IMAGE FORMING APPARATUS FOR PREDICTING USAGE OF CONSUMABLES AND CONTROL METHOD FOR IMAGE FORMING APPARATUS

CROSS-REFERENCE TO RELATED APPLICATIONS

This application is a continuation of U.S. patent application Ser. No. 17/394,250, which was filed on Aug. 4, 2021 and which is a continuation of U.S. patent application Ser. No. 16/666,204, which was filed on Oct. 28, 2019 and which claims priority to Japanese Patent Application No. 2018-205869, which was filed on Oct. 31, 2018. These applications are hereby incorporated by reference herein.

BACKGROUND

Field of the Disclosure

The present disclosure relates to an image forming apparatus and a control method for the image forming apparatus.

Description of the Related Art

Image forming apparatuses, such as a printer, a copier, or a facsimile, include a plurality of consumable items, such as a toner container (a toner cartridge) and a collected toner container. These consumable items are consumed, decrease, or deteriorate, with operations of the image forming apparatus. Further, these consumable items deteriorate over time or materials contained in the containers run out, so that these consumable items become eventually unusable.

In order to maintain print quality in the image forming apparatuses at a satisfactory level, each of these consumable items is regularly replaced by a user or a service engineer.

Japanese Patent Application Laid-Open No. 2017-37596 discusses an image forming apparatus that predicts a remaining amount of a consumable material contained in a container, such as a toner container, for each number of days in use. This image forming apparatus issues a delivery request to a maintenance server for the consumable item when the predicted remaining amount of the consumable material becomes an amount corresponding to the number of delivery days (the number of days for delivery) that has been set.

SUMMARY

According to some embodiments, an image forming apparatus on which a replaceable container storing a recording material for forming an image on a sheet is mounted, the image forming apparatus includes an image forming unit configured to form an image using the recording material supplied from the container, a determination unit configured to determine whether the container mounted on the image forming apparatus satisfies a predetermined condition, an acquisition unit configured to acquire an amount of the recording material used for image formation in a predetermined period, the recording material being stored in the container determined by the determination unit as a container that satisfies the predetermined condition, a memory configured to accumulate information indicating the amount of the recording material acquired by the acquisition unit, and a prediction unit configured to predict a number of days about replacement of the container, based on the information indicating the amount of the recording material and accumulated in the memory.

Further features of various embodiments will become apparent from the following description of exemplary embodiments with reference to the attached drawings.

DESCRIPTION OF THE EMBODIMENTS

Exemplary embodiments will be described below with reference to the drawings.

Figure 1:
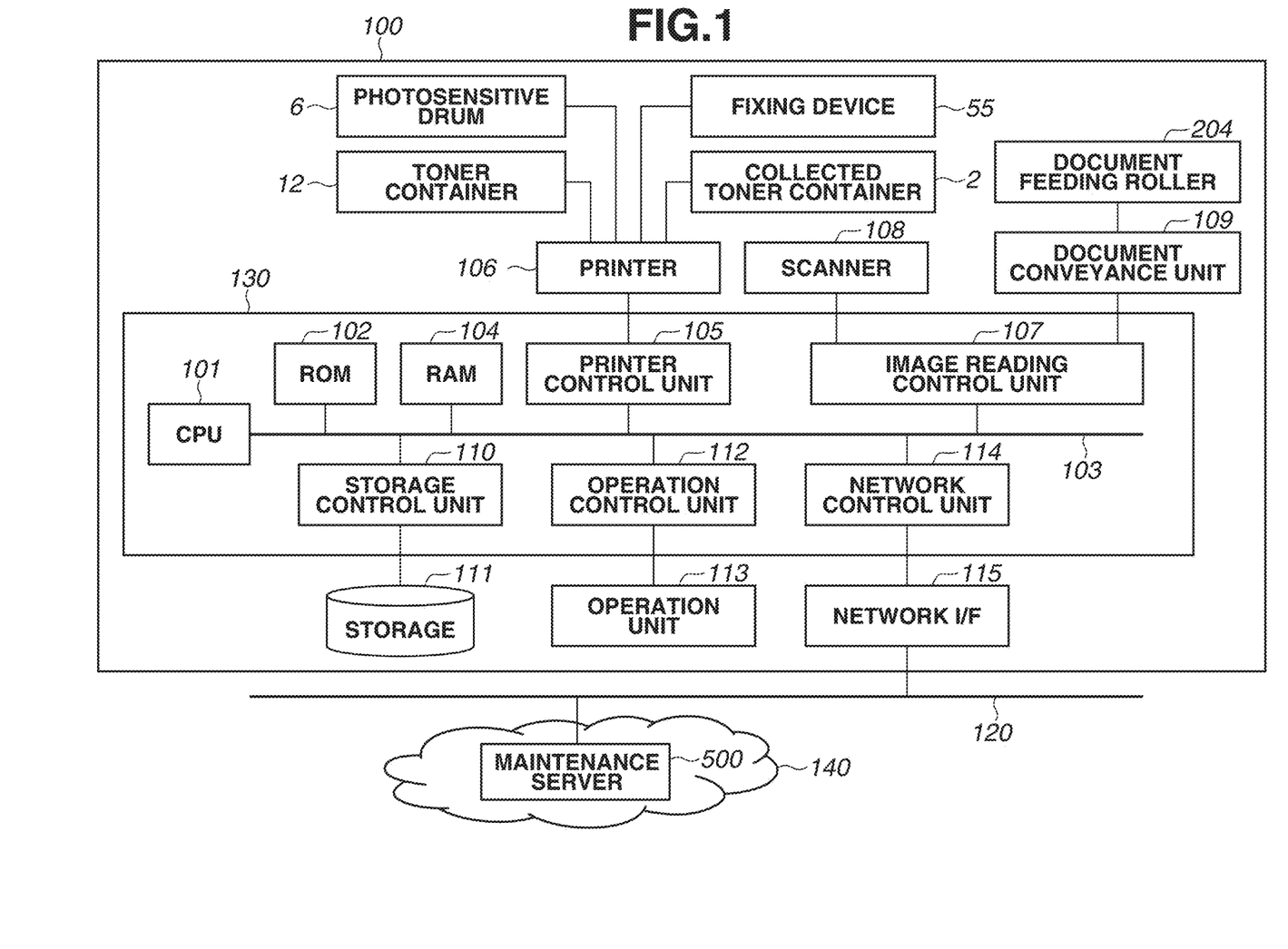
FIG. 1 is a block diagram illustrating an example of a hardware configuration of an image forming apparatus.

FIG. 1 is a block diagram illustrating an example of a hardware configuration of an image forming apparatus 100 according to an exemplary embodiment.

In FIG. 1, the image forming apparatus 100 includes a controller 130 including a central processing unit (CPU) 101.

The controller 130 further includes a read only memory (ROM) 102, a random access memory (RAM) 104, a printer control unit 105, an image reading control unit 107, a storage control unit 110, and an operation control unit 112.

The components of the controller 130 are connected by a bus 103.

The image forming apparatus 100 further includes pieces of hardware, such as a storage 111, a printer 106, a scanner 108, a document conveyance unit 109, and an operation unit 113.

The printer control unit 105, the image reading control unit 107, the storage control unit 110, and the operation control unit 112 included in the controller 130 each function as interfaces of the corresponding pieces of hardware which are controlled by the CPU 101.

The components of the image forming apparatus 100 include a consumable item that can be replaced by a user or a service engineer.

For example, the printer 106 includes a toner container 12 and a collected toner container 2 as the replaceable consumable items. These consumable items are detachably attached to the printer 106.

According to the present exemplary embodiment, detection of the amount of remaining toner in the toner container 12 becoming a threshold or less will be referred to as consumption. Further, detection of an amount of toner not used in printing and collected into the collected toner container 2 becoming a threshold or more will be referred to as consumption.

Therefore, detecting a usage (an amount of use) of the consumable item in, for example, the toner container or the collected toner container (a consumption degree becoming a threshold or more) will be hereinafter referred to as the consumption.

An item having a relatively low consumption degree, such as a photosensitive drum 6 or a fixing device 55, may be excepted from notification of the number of remaining days.

The printer 106 forms an image by an electrophotographic method with which an image is printed on a sheet by forming a toner image based on bitmap data generated by the controller 130 and fixing the toner image.

The printer 106 may adopt an ink-jet method with which an image is printed by discharging ink onto a sheet.

In the electrophotographic method, a recording material is toner. In the ink-jet method, a recording material is ink.

The document conveyance unit 109 includes a document feeding roller 204.

According to the present exemplary embodiment, the consumable item is described as an item that can be replaced by a user, but the consumable item is not limited to this example. Examples of the consumable item may include a consumable item to be replaced by a service engineer.

The controller 130 including the CPU 101 controls the entire image forming apparatus 100.

The CPU 101 starts an operating system (OS), using a boot program stored in the ROM 102.

The CPU 101 then executes a control program stored in the storage 111 or the ROM 102, on the OS.

The RAM 104 is used as a main memory or a temporary storage area, such as a work area of the CPU 101.

The storage 111 is a readable and writable nonvolatile storage device, such as a hard disk drive (HDD).

The storage 111 stores programs, such as a program for controlling the entire image forming apparatus 100, various application programs, and various data, such as image data, and the number of remaining days of a consumable item set via the operation unit 113.

The CPU 101 accesses the storage 111 via the storage control unit 110.

The CPU 101 controls the image forming apparatus 100 by executing a program that is the control program or an application program read out from the storage 111 or the ROM 102 and then loaded into the RAM 104.

In the image forming apparatus 100 of the present exemplary embodiment, the CPU 101 executes processing in each operation in flowcharts to be described below, using the program loaded into the memory (the RAM 104), but other mode may be adopted.

For example, a plurality of processors, RAMs, ROMs, and storages can execute the processing in each operation in the flowcharts to be described below, by working together. Further, part of the processing may be executed using a hardware circuit, such as an application specific integrated circuit (ASIC) or a field programmable gate array (FPGA).

The CPU 101 controls the scanner 108 via the image reading control unit 107, reads an image on a document, and generates image data.

The CPU 101 can also control the document conveyance unit 109 having an automatic document feeder (ADF) to convey documents placed in a document tray of the document conveyance unit 109 one by one to the scanner 108, and generate image data.

The scanner 108 scans the document using an optical reader, such as a charge coupled device (CCD), and converts image information about the document into electrical signal data.

The image data obtained by reading the image on the document is stored into the storage 111, so that the image data is used for processing, such as print processing.

The operation control unit 112 connects the operation unit 113 and the controller 130.

The operation unit 113 functions as a display unit for displaying information to the user or a receiving unit for receiving an instruction from the user. The operation unit 113 includes a touch panel display for displaying an operation screen to be described below and receiving an input from the user. The operation unit 113 may have hardware keys, such as a start key, and a status check/stop key that is used by the user to change the displayed screen to a status screen for checking a status of the image forming apparatus 100 or stopping a job.

A network control unit 114 connects a network interface (I/F) 115 and a wired local area network (LAN) 120 via a LAN cable.

A maintenance server 500 on the Internet 140 is connected to the wired LAN 120 via a LAN cable.

The network I/F 115 can communicate with the maintenance server 500 on the wired LAN 120.

Figure 2A:
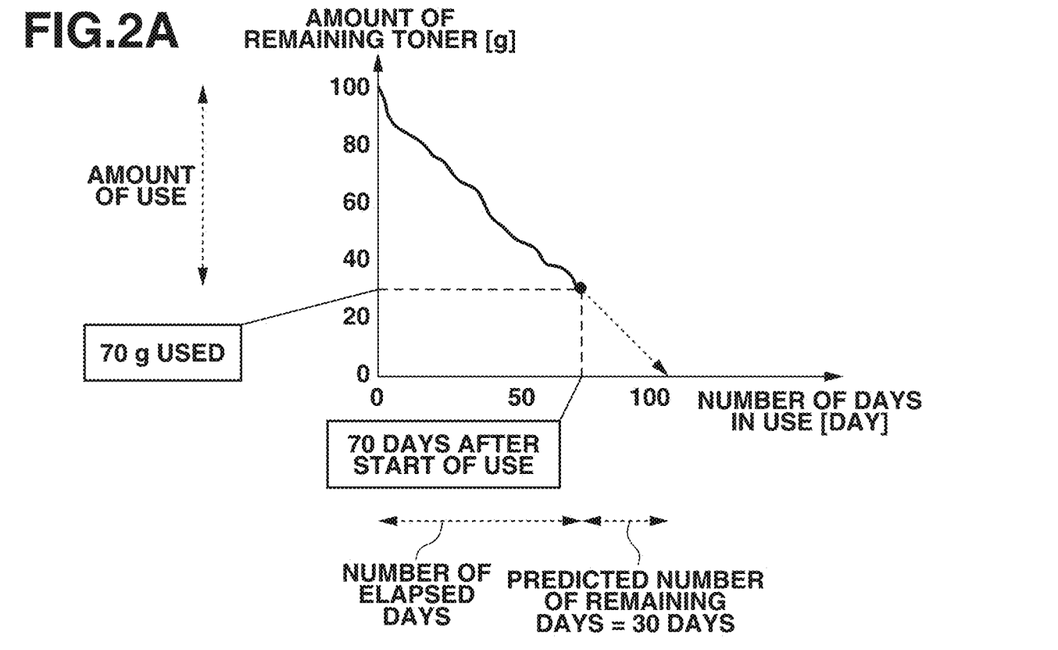
FIGS. 2A and 2B are diagrams each illustrating a calculation of the number of remaining days for a consumable item.
Figure 2B:
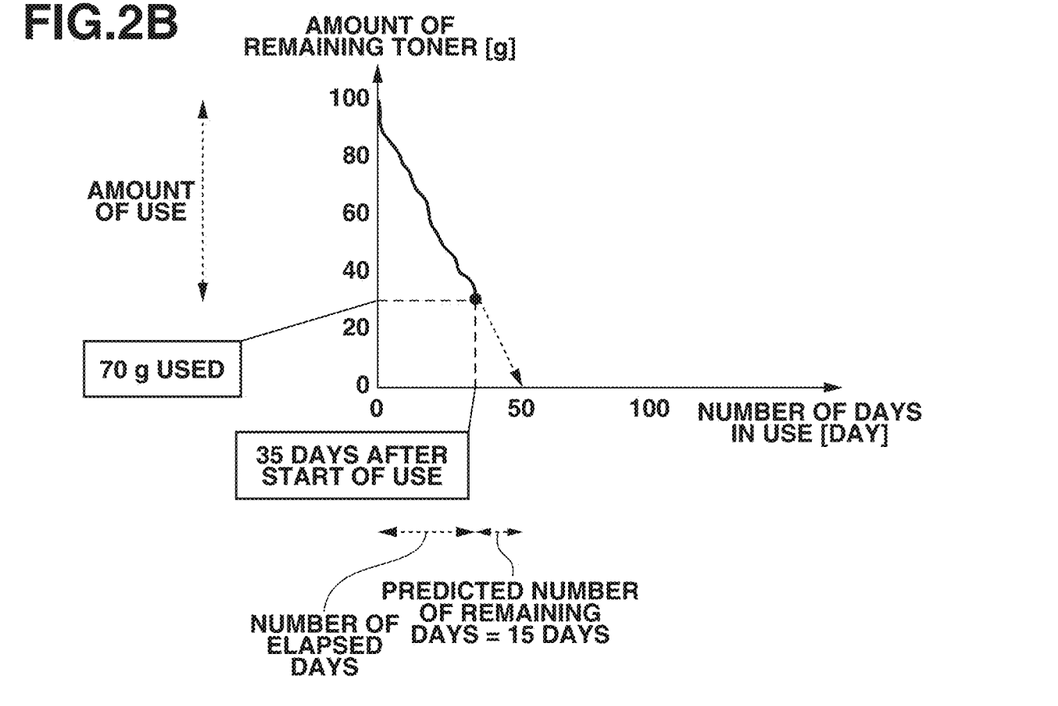

FIGS. 2A and 2B are diagrams each illustrating a relationship between the amount of toner remaining in a toner container serving as the consumable item and the number of days in use. A horizontal axis indicates the number of days elapsed from the start of use of the toner container (the zero-th day), and a vertical axis indicates the amount of the toner remaining in the container.

FIG. 2A illustrates a change in the amount of remaining toner per day, by subtracting the amount of toner used per day from the initial amount of toner in a new toner container. When 70 days have elapsed since the start of use of the new toner container, the number of remaining days before the toner in the toner container runs out (the number of days before the amount of the toner remaining in the container becoming zero is detected) is predicted, based on a previous change in the amount of the remaining toner.

In a case where the toner container is used for 70 days, as illustrated in FIG. 2A, an average amount of use is 1 g/day because, by calculation using the following example of a method of predicting the number of remaining days, the obtained number of days of actual use is 70 days and the obtained amount of the toner used is 70 g. In this way, the amount of use of the consumable item in a predetermined period is acquired. In a case where the value of the amount thus acquired is used, the toner of the remaining amount of 30 g in the container runs out 30 days later from the prediction date (100 days later after the start of use).

Examples of equations for remaining-days prediction, for predicting the number of days before the consumable item is consumed to a threshold or more and the consumption is detected (i.e., before running out), will be described below.

Amount of use (g) of current consumable item=Remaining amount (g) of current consumable item at start of use−Current remaining amount (g) of current consumable item.

Number of elapsed days (day) of current consumable item=Last date and time of use of current consumable item−Use starting date and time of current consumable item.

Average amount of use (g/day) of current consumable item=Amount of use (g) of current consumable item÷Number of elapsed days (day) of current consumable item.

Number of remaining days (day)=Current remaining amount (g) of current consumable item÷Average amount of use (g/day) of current consumable item.

In a case where the toner container is replaced, a value used for predicting the number of remaining days before the toner container is replaced is used for predicting of the number of remaining days after replacement of the toner container. More specifically, a method for predicting the number of remaining days in a case where the toner container is replaced is as follows.

> Cumulative amount of use (g) before current consumable item replacement=Σ(Remaining amount (g) of current consumable item at start of use−Remaining amount (g) of consumable item at end of use).

> Cumulative number of elapsed days (day) before current consumable item replacement=Σ(Use ending date and time of consumable item−Use starting date and time of consumable item).

> Amount of use (g) of consumable item=Cumulative amount of use (g) before current consumable item replacement+Amount of use (g) of current consumable item.

> Number of elapsed days (day) of consumable item=Cumulative number of elapsed days (day) before current consumable item replacement+Number of elapsed days (day) of current consumable item.

> Average amount of use (g/day) of consumable item=Amount of use (g) of consumable item÷Number of elapsed days (day) of consumable item.

> Number of remaining days (day)=Current remaining amount (g) of current consumable item÷Average amount of use (g/day) of consumable item.

In this way, since the number of remaining days of toner is predicted using information about the replaced consumable item after the consumable item replacement, data is accumulated each time the consumable item is replaced. By appropriately performing this data accumulation, improvement in prediction accuracy can be expected.

The prediction of the number of remaining days may be executed regularly (e.g., per second), or may be executed at predetermined timing (e.g., each time image formation per unit for printing such as one image or one page is performed). Further, the prediction may be executed when the user issues an instruction for the prediction.

The cumulative amount of use of the toner, the cumulative number of elapsed days, the remaining amount at the start of use of the toner container, the use starting date and time, and the predicted number of remaining days are stored in the RAM 104 or the storage 111, and these values are updated each time the prediction is performed.

FIG. 2A illustrates an example in which a designated consumable item manufactured by a designated manufacturer (hereinafter referred to as the designated consumable item) is used, and FIG. 2B illustrates an example in which a consumable item manufactured by a manufacturer other than the designated manufacturer (hereinafter referred to as the non-designated consumable item) is used.

FIG. 2B illustrates a change in the amount of remaining toner per day, by subtracting the amount of toner used per day from the initial amount of toner in a new toner container. When 35 days have elapsed since the start of use of the new toner container, the number of remaining days before the toner in the toner container runs out (the number of days before the amount of the toner remaining in the container becoming zero is detected) is predicted, based on a previous change in the amount of the remaining toner.

The number of remaining days in FIG. 2B is calculated by a method similar to the remaining amount calculation in FIG. 2A. More specifically, an average amount of use is 2 g/day because the number of days in use is 35 days and the amount of use is 70 g. It can be predicted that the toner of the remaining amount of 30 g is consumed 15 days later with reference to the prediction date (50 days later following the start of use).

Figure 3:
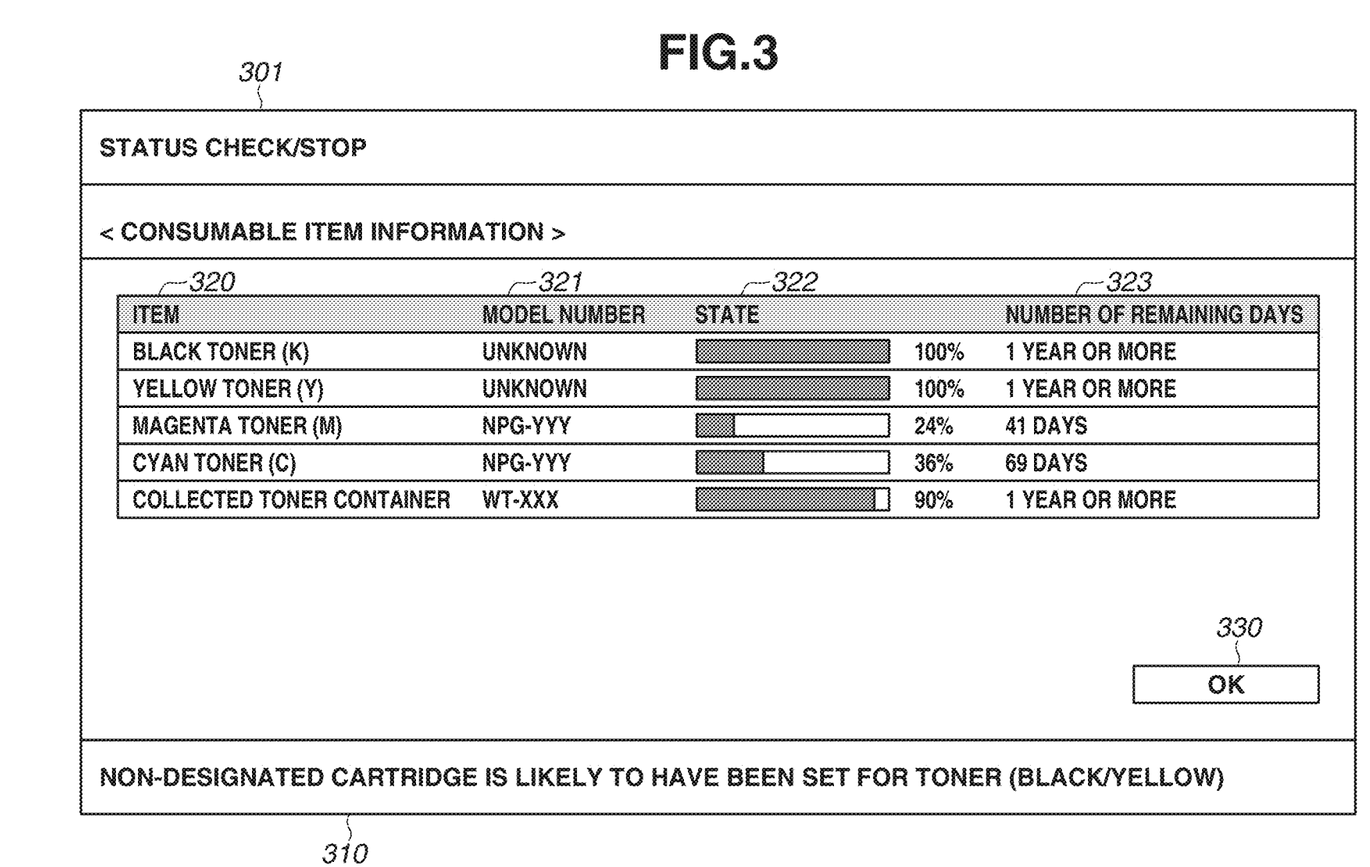
FIG. 3 is a diagram illustrating an example of a screen to be displayed on an operation unit in the image forming apparatus.

FIG. 3 is a diagram illustrating an example of a screen that is displayed on the operation unit 113 to display information based on the consumption degree and the number of remaining days of the consumable item.

The screen illustrated in FIG. 3 is a screen example in a case where the operation unit 113 is controlled and displayed based on display data generated by the CPU 101 executing the program stored in the storage 111.

FIG. 3 shows a status check/stop screen 301 is illustrated as an example.

The operation unit 113 displays a screen including a main display area and a status display area 310.

The status display area 310 is an area for displaying a message about a maintenance event occurring in the image forming apparatus 100.

In a case where a plurality of maintenance events occurs, messages about the maintenance events may be sequentially displayed in the status display area 310.

When detecting the status check key (not illustrated) being pressed by the user, the CPU 101 displays the status check/stop screen 301 on the operation unit 113.

The status check/stop screen 301 displays an item display field 320, a model number display field 321, a state display field 322, and a remaining days display field 323.

An OK key 330 is a key for closing the status check/stop screen 301. When the OK key 330 is pressed, the status check/stop screen 301 is closed, and a different screen (not illustrated) appears.

The item display field 320 displays a list of consumable items, such as a toner container of each color, a collected toner container, a photosensitive drum of each color, a fixing device, and a document feeding roller.

A model number indicated in the model number display field 321 is identification information for identifying a consumable item mounted on an image forming apparatus. Consumable items mounted on different image forming apparatuses manufactured by the same manufacturer may be different from each other if the types (such as a high-speed machine and a low-speed machine) of these image forming apparatuses are different from each other. When the user places an order for a consumable item, this model number is used.

In a case where mounting of the non-designated consumable item is detected, for example, "unknown" is displayed.

In the example illustrated in FIG. 3, cartridges other than a cartridge manufactured by the designated manufacturer (the non-designated consumable item) are used for black toner and yellow toner. In this case, a message saying, for example, "non-designated cartridge is likely to have been set for toner (black/yellow)" appears in the status display area 310 of the operation unit 113 to inform the user.

The state display field 322 is configured to display an indicator and a percentage indicating a consumption degree of the consumable item.

In a case where mounting of the non-designated consumable item is detected, "100%" is continuously displayed because the consumption degree cannot be accurately determined. In this case, a numeric value other than "100%" may be displayed. Any applicable type of indication mode, such as gray-out display, may be adopted to differentiate a case where the non-designated consumable item is mounted and a case where the designated consumable item is mounted.

The remaining days display field 323 displays a value indicating the number of remaining days of the consumable item. This number of remaining days is the result of the prediction performed by the above-described method. The number of remaining days that is the prediction result is displayed for each of the consumable items. With this display, the user can understand the amount of the remaining toner easily and intuitively.

In a case where mounting of the non-designated consumable item is detected, the consumption degree cannot be accurately determined and thus the prediction cannot be accurately performed. Therefore, for example, "1 year or more" is continuously displayed, accompanying the above-described display example. Here, a numeric value other than "1 year" may be displayed. Any applicable type of indication mode, such as gray-out display, may be adopted to differentiate a case where the non-designated consumable item is mounted and a case where the designated consumable item is mounted.

Next, an operation of the image forming apparatus 100 will be described with reference to a flowchart in FIG. 4. In this operation, after the image forming apparatus 100 is activated by power-on and the consumable item is consumed by performing printing, the predicted number of remaining days of the consumable item is updated, and the image forming apparatus 100 is shut down.

In a first exemplary embodiment, in a case where the image forming apparatus using the consumable item operates in a state of being mounted with the non-designated consumable item, information to be used for prediction of the number of remaining days of the consumable item is not updated. In other words, values, such as the amount of use of the consumable item and the number of elapsed days after the mounting of the consumable item while the non-designated consumable item is mounted, can be prevented from being used for the prediction of the number of remaining days when the designated consumable item is mounted.

With the above-described configuration, decrease in the prediction accuracy of the number of remaining days when the designated consumable item is mounted can be prevented.

The details will be described below.

Figure 4:
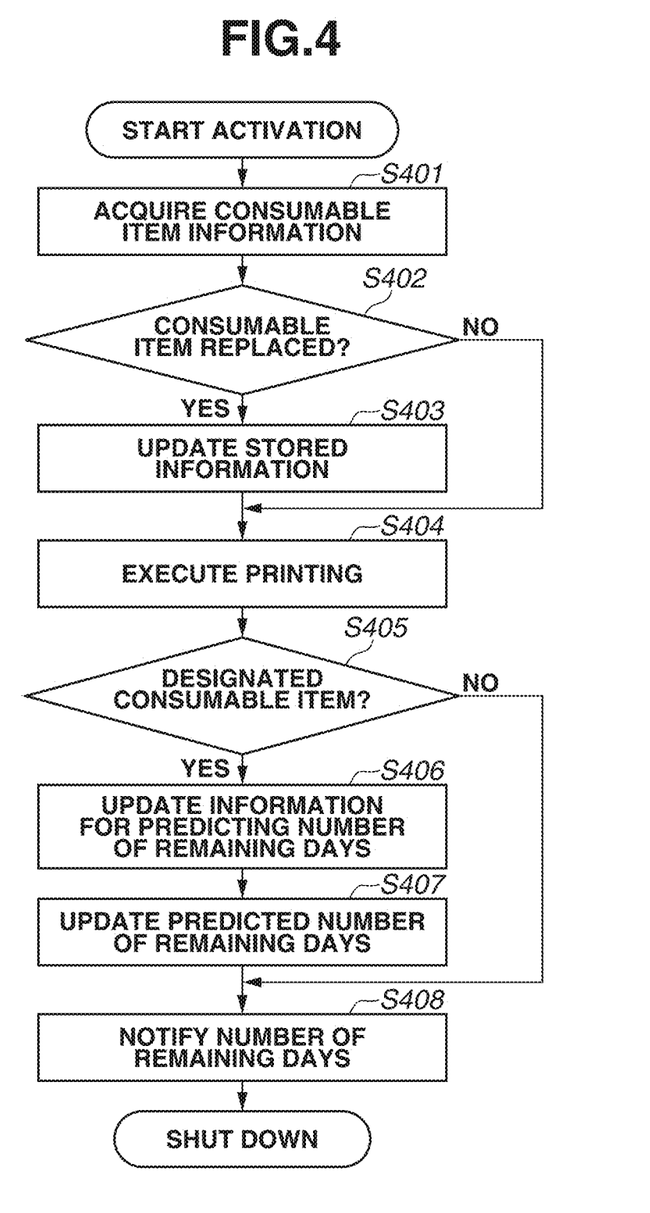
FIG. 4 is a flowchart illustrating the predicting of the number of remaining days for a consumable item of the image forming apparatus.

In the flowchart illustrated in FIG. 4, the detailed description will be provided by using the toner container as the consumable item. Alternatively, the predicted number of remaining days can be updated for another consumable item by a similar method.

Each operation procedure illustrated in the flowchart in FIG. 4 is executed by the CPU 101 reading out a program stored in the ROM 102 or the storage 111 to implement corresponding control modules.

First, in S401, the CPU 101 acquires consumable item information.

Specifically, for example, the CPU 101 acquires at least a serial number, manufacturer information, color information, and toner remaining amount information from the toner container 12 via the printer control unit 105, as information of the toner container 12. These pieces of information are stored in the RAM 104.

Here, the manufacturer information about the toner container 12 is information for guaranteeing that the toner remaining amount information can be accurately acquired. The manufacturer can be identified by this information. For example, a character string representing a company name that is the manufacturer or character string information is included as the manufacturer information. There may be a case where neither a specific character string nor character string information is included as the manufacturer information. In this case, information indicating unsuccessful acquisition of the manufacturer information may be included as the manufacturer information among the information acquired as the information of the toner container 12.

Next, in S402, the CPU 101 determines whether the consumable item has been replaced.

In the case of the toner container 12, the CPU 101 determines whether the consumable item has been replaced by comparing the serial number of the mounted toner container that is information acquired and stored into the storage 111 at the previous activation and the serial number of the currently mounted toner container acquired in S401.

When the image forming apparatus 100 is activated for the first time, the CPU 101 determines that "the consumable item is replaced" in S402.

In a case where the CPU 101 determines that the consumable item is replaced (YES in S402), the operation proceeds to S403. In S403, the CPU 101 updates (writes) information for predicting the number of remaining days stored in the storage 111.

For example, the CPU 101 updates the remaining amount of the current consumable item at the start of use, the use starting date and time of the current consumable item, the cumulative amount of use before the current consumable item replacement, and the cumulative number of elapsed days before the current consumable item replacement.

Further, for the replacement determination at the next activation, the CPU 101 saves the serial number acquired in S401 into the storage 111.

In a case where the CPU 101 determines that the consumable item is not replaced (NO in S402), the operation proceeds to S404.

The processing from S401 to S404 is executed at the activation of the image forming apparatus 100.

Next, in S404, the printer 106 executes printing of an image using bitmap data generated by the controller 130 based on print data input from an external information apparatus. The processing in S404 is not limited to a printing operation. Alternatively, any types of processing in which the consumable item (consuming the toner in the toner container, in this example) is consumed may be executed.

Next, in S405, the CPU 101 determines whether each consumable item for which the predicted number of remaining days is to be updated because of the processing in S404 is the designated consumable item.

In the case of the toner container 12, the CPU 101 determines whether the currently mounted consumable item is the designated consumable item by using the manufacturer information acquired in S401. For example, the CPU 101 determines whether the specific character string is included in the manufacturer information.

In a case where the CPU 101 determines that the consumable item is the designated consumable item (YES in S405), the operation proceeds to S406. In S406, the CPU 101 updates the information for predicting the number of remaining days stored in the storage 111 and the RAM 104.

More specifically, for example, the CPU 101 updates the last date and time of use of the current consumable item and the current remaining amount of the current consumable item stored in the memory.

In S407, the CPU 101 updates the predicted number of remaining days of the consumable item.

In a case where the CPU 101 determines that the consumable item is the non-designated consumable item (NO in S405), the operation proceeds to S408.

In S408, when the user presses the status check key (not illustrated), the CPU 101 displays the status check/stop screen 301 indicating the updated number of remaining days, on the operation unit 113.

As described above, only in a case where it is determined that the designated consumable item is mounted in the process of predicting the number of remaining days of the consumable item in the image forming apparatus, the information used for predicting the number of remaining days stored in the memory is updated in response to the consumption of the consumable item, such as the print operation.

With the above described configuration, in a case where it is determined that the consumable item other than the designated consumable item is mounted, the information for predicting the number of remaining days is not updated. Consequently, the number of remaining days can be appropriately predicted, in a case where the designated consumable item is mounted again later.

In the present exemplary embodiment, the predicted number of remaining days is updated at the predetermined timing (e.g., each time image formation is performed per unit for printing, such as per image or per page). However, the update timing is not limited to the above described example. The update timing may be every predetermined time (e.g., per second), or may be at the timing designated by the user.

In the first exemplary embodiment, the number of remaining days is predicted only in a case where the designated consumable item is mounted on the image forming apparatus 100. In the first exemplary embodiment, if the non-designated consumable item is mounted, the display such as "1 year or more" is continuously displayed as the number of remaining days on the operation unit 113, and the consumption status of the consumable item is not clear to the user.

Therefore, in a second exemplary embodiment, a value for the cumulative amount of use (g) before replacement of the current consumable item and the cumulative number of elapsed days (day) before replacement of the current consumable item is stored for each of the designated consumable item and the non-designated consumable item. The number of remaining days for the mounted non-designated consumable item is also predicted, and the predicted number of remaining days is displayed on a display portion of the operation unit 113.

Figure 5:
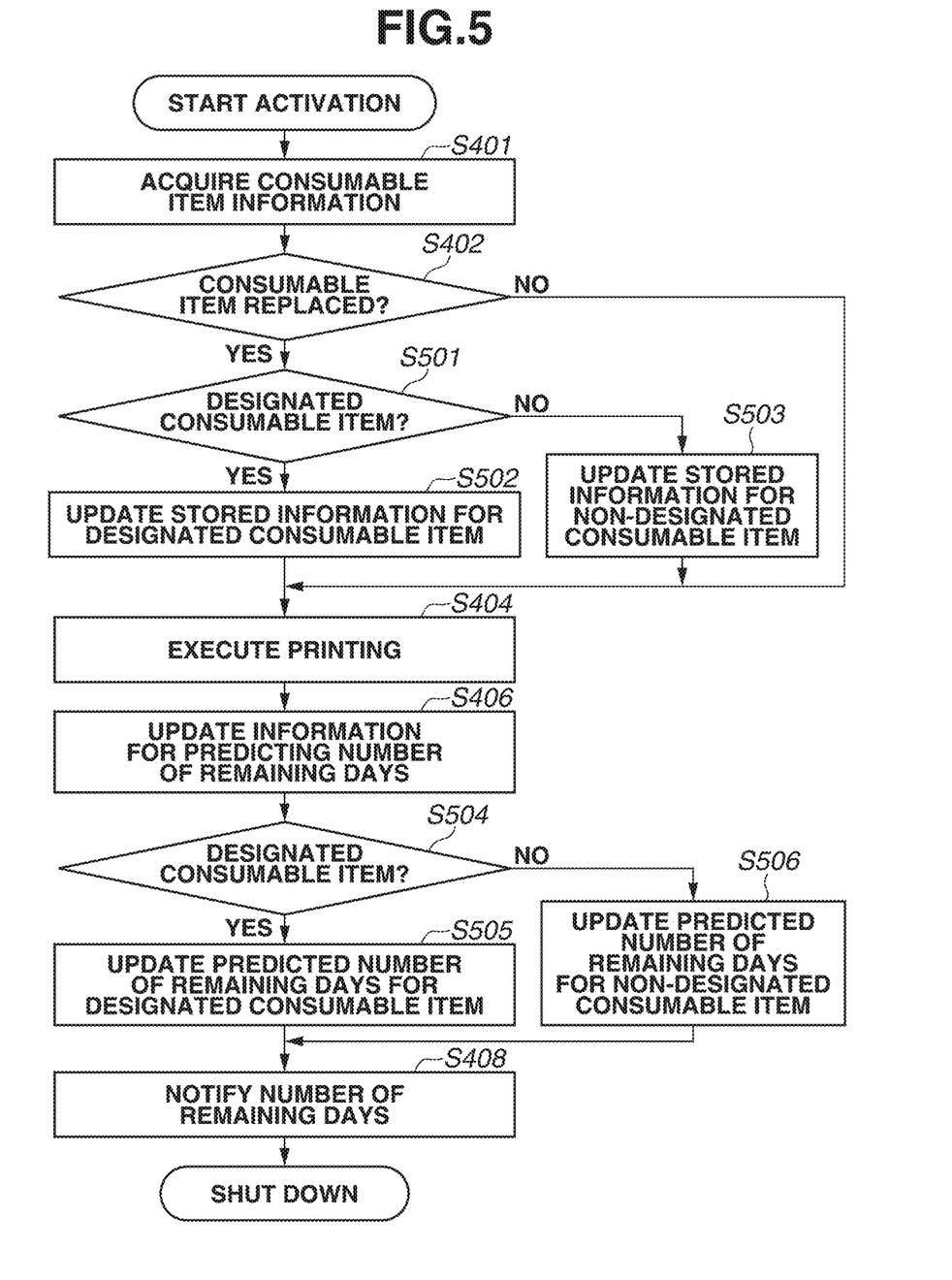
FIG. 5 is a flowchart illustrating the predicting of the number of remaining days for a consumable item of the image forming apparatus.

With the above described configuration, a point different from the first exemplary embodiment will be described with reference to a flowchart in FIG. 5.

Processing from S401 to S402 is similar to that in the first exemplary embodiment.

In a case where the CPU 101 determines that the consumable item is replaced (YES in S402), the operation proceeds to S501.

In S501, the CPU 101 determines whether the replaced consumable item is the designated consumable item.

In a case where the replaced consumable item is the toner container 12, the CPU 101 determines whether the mounted consumable item is the designated consumable item using the specific character string included in the manufacturer information acquired in S401.

In a case where the CPU 101 determines that the mounted consumable item is the designated consumable item (YES in S501), the operation proceeds to S502. The value of the designated consumable item in the second exemplary embodiment is similar to the value stored in the first exemplary embodiment. Therefore, the processing in S502 is similar to the processing in S403.

In a case where the CPU 101 determines that the mounted consumable item is the non-designated consumable item (NO in S501), the operation proceeds to S503. In S503, the CPU 101 updates the information for predicting the number of remaining days of the non-designated consumable item stored in the storage 111 and the RAM 104. This information is different from the information saved in each of S502 and S403. The operation then proceeds to S404.

The processing in S503 is for the non-designated consumable item, for example. The cumulative amount of use (g) before replacement of the current consumable item and the cumulative number of elapsed days (day) before replacement of the current consumable item are updated, and the operation proceeds to S404.

In S404 and S406, processing similar to the processing described in the first exemplary embodiment is performed. In S504, determination similar to that in S501 is performed. In a case where the CPU 101 determines that the mounted consumable item is the designated consumable item (YES in S504), the operation proceeds to S505. The value of the designated consumable item according to the present exemplary embodiment is similar to the value saved in the first exemplary embodiment. Therefore, the processing in S505 is similar to the processing in S407.

In a case where the CPU 101 determines that the mounted consumable item is the non-designated consumable item (NO in S504), the operation proceeds to S506. In S506, the CPU 101 updates the information for predicting the number of remaining days of the non-designated consumable item stored in the RAM 104. This information is different from that in S505 and S407. The operation then proceeds to S408.

Processing in S408 is similar to the processing described in the first exemplary embodiment.

As described above, in the second exemplary embodiment, the number of remaining days of the mounted non-designated consumable item can also be predicted. Therefore, in a case where the non-designated consumable item is mounted, the number of remaining days of the consumable item can also be notified to the user.

In other words, as for the case where the designated consumable item is mounted and the case where the non-designated consumable item is mounted, different memories are used to store and update the information used for predicting the remaining amount of the consumable item, for the respective cases. Therefore, the remaining amount of the consumable item can be accurately predicted in each of the cases.

Among the non-designated consumable items, for example, there is also a case where a non-designated toner container A and a non-designated toner container B require predictions different from each other. Therefore, in a case where the replacement of the non-designated consumable item is detected and when the mounting of the non-designated consumable item is detected, the cumulative amount of use (g) before replacement of the current consumable item and the cumulative number of elapsed days (day) before replacement of the current consumable item for the non-designated consumable item may be initialized.

OTHER EMBODIMENTS

Some embodiments are also implemented as follows. A piece of software (a program) for implementing the functions of each of the above-described exemplary embodiments is supplied to a system or apparatus via a network or any of various storage media, and a computer (or a CPU or a micro processing unit (MPU)) of the system or apparatus executes processing by reading out the program.

In predicting the days (the number of remaining days) before the consumption of the consumable item mounted on the image forming apparatus is detected, the number of remaining days can be appropriately predicted when the consumable item manufactured by the designated manufacturer is mounted even if the consumable item manufactured by a manufacture other than the designated manufacturer has been mounted. With this configuration, the prediction accuracy of the number of remaining days for the consumable item when the consumable item manufactured by the designated manufacturer is mounted on the image forming apparatus can be improved.

Some embodiment(s) can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that various embodiments are not limited to the disclosed exemplary embodiments. The scope of the following claims is to be accorded the broadest interpretation so as to encompass all such modifications and equivalent structures and functions.

What is claimed is:

1. An image forming apparatus to which a container containing a recording material to be used for forming an image on a recording medium is attached, the image forming apparatus comprising a controller configured to:
   acquire a period based on information regarding an amount of the recording material supplied from a container that was attached to the image forming apparatus and that has been detached from the image forming apparatus; and
   cause a display to display the acquired period as a remaining period of another container attached to the image forming apparatus.

2. The image forming apparatus according to claim 1, wherein the information is information based on a total amount of an amount of the recording material supplied from the container and an amount of the recording material supplied from said another container.

3. The image forming apparatus according to claim 2, wherein the information is information based on a total period of a period in which the container has been attached to the image forming apparatus and a period in which said another container is attached to the image forming apparatus.

4. The image forming apparatus according to claim 2, wherein the remaining period of said another container is specified based on an amount of the recording material contained in said attached container and the information.

5. The image forming apparatus according to claim 1, wherein the information indicates a usage amount of the recording material per day.

6. A control method for controlling an image forming apparatus to which a container containing a recording material to be used for forming an image on a recording medium is attached, the control method comprising:
   acquiring a period based on information regarding an amount of the recording material supplied from a container that was attached to the image forming apparatus and that has been detached from the image forming apparatus; and
   causing a display to display the acquired period as a remaining period of another container attached to the image forming apparatus.

7. The control method according to claim 6, wherein the information is information based on a total amount of an amount of the recording material supplied from the container and an amount of the recording material supplied from said another container.

8. The control method according to claim 7, wherein the information is information based on a total period of a period in which the container has been attached to the image forming apparatus and a period in which said another container is attached to the image forming apparatus.

9. The control method according to claim 6, wherein the information indicates a usage amount of the recording material per day.

10. The control method according to claim 6, wherein the remaining period of said another container is specified based on an amount of the recording material contained in said another container and the information.

11. A non-transitory computer readable media storing instructions that, when executed by an image forming apparatus to which a container containing a recording material to be used for forming an image on a recording medium is attached, cause the image forming apparatus to perform a method comprising:
   acquiring a period based on information regarding an amount of the recording material supplied from a container that was attached and that has been detached from the image forming apparatus; and
   causing a display to display the acquired period as a remaining period of another container attached to the image forming apparatus.

12. The non-transitory computer readable media according to claim 11, wherein the information is information based on a total amount of an amount of the recording material supplied from the container and an amount of the recording material supplied from said another container.

13. The non-transitory computer readable media according to claim 12, wherein the information is information based on a total period of a period in which the container has been attached to the image forming apparatus and a period in which said another container is attached to the image forming apparatus.

14. The non-transitory computer readable media according to claim 12, wherein the remaining period of said another container is specified based on an amount of the recording material contained in said another container and the information.

\* \* \* \* \*